United States Patent
Tanabe et al.

(10) Patent No.: US 10,187,001 B2
(45) Date of Patent: Jan. 22, 2019

(54) MOTOR DRIVE DEVICE INCLUDING SHARED CONVERTER

(71) Applicant: FANUC CORPORATION, Minamitsuru-gun, Yamanashi (JP)

(72) Inventors: Yoshikiyo Tanabe, Yamanashi (JP); Masaru Kino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/794,485

(22) Filed: Oct. 26, 2017

(65) Prior Publication Data

US 2018/0123498 A1    May 3, 2018

(30) Foreign Application Priority Data

Oct. 31, 2016  (JP) .................. 2016-213240

(51) Int. Cl.

| G05B 23/02 | (2006.01) |
|---|---|
| H02P 27/08 | (2006.01) |
| G05B 19/05 | (2006.01) |
| H02P 29/024 | (2016.01) |
| H02M 1/32 | (2007.01) |
| H02M 1/42 | (2007.01) |
| H02M 1/44 | (2007.01) |

(Continued)

(52) U.S. Cl.
CPC ............ *H02P 27/08* (2013.01); *G05B 19/058* (2013.01); *H02M 1/32* (2013.01); *H02P 29/024* (2013.01); *H02P 29/025* (2013.01); G05B 2219/14006 (2013.01); H02M 1/42 (2013.01); H02M 1/44 (2013.01); H02M 5/458 (2013.01); H02M 7/53871 (2013.01)

(58) Field of Classification Search
CPC ..... H02P 27/08; H02P 29/024; G05B 19/058; G05B 2219/14006; H02M 1/42; H02M 1/44
USPC .......................................................... 318/565
See application file for complete search history.

(56) References Cited

U.S. PATENT DOCUMENTS 9,588,501 B2 * 3/2017 Tanabe ...................... G05B 9/02
9,751,246 B2 * 9/2017 Wakebe .............. B29C 45/7626
(Continued)

FOREIGN PATENT DOCUMENTS

| JP | 2002159198 A | 5/2002 |
|---|---|---|
| JP | 2005112598 A | 4/2005 |

(Continued)

*Primary Examiner* — Bickey Dhakal
*Assistant Examiner* — Gabriel Agared
(74) *Attorney, Agent, or Firm* — RatnerPrestia

(57) ABSTRACT

A motor drive device includes: a converter which converts AC power of an AC power source side to DC power and outputs the same to a DC link; a DC link capacitor; an inverter in which each switching element is controlled based on a switching drive signal supplied, thereby performing power conversion between DC power of the DC link and AC power of a motor side; a DC/DC converter which converts DC power of the DC link to DC power for a control power source; a servo motor control circuit which outputs the switching drive signal; a torque cut-off circuit which cuts off source of each switching drive signal to each switching element, thereby stopping a motor when not receiving a safety signal; and a safety monitor circuit which stops transmission of the safety signal during an abnormality of the torque cut-off circuit.

7 Claims, 17 Drawing Sheets

(51) Int. Cl.
   *H02M 5/458*   (2006.01)
   *H02M 7/5387*  (2007.01)

(56) References Cited

U.S. PATENT DOCUMENTS

| | | | | |
|---|---|---|---|---|
| 2009/0251831 A1* | 10/2009 | Shiba | ............... | B60L 3/003 |
| | | | | 361/30 |
| 2011/0193509 A1* | 8/2011 | Ooyama | ............ | H02M 1/12 |
| | | | | 318/503 |
| 2013/0169204 A1* | 7/2013 | Kuboe | ............ | H02M 5/458 |
| | | | | 318/400.3 |
| 2013/0221888 A1* | 8/2013 | Horikoshi | ........... | H02P 27/06 |
| | | | | 318/400.29 |
| 2014/0306634 A1* | 10/2014 | Sakai | ............ | H02P 27/085 |
| | | | | 318/490 |
| 2015/0212496 A1* | 7/2015 | Tanabe | ............ | G05B 9/02 |
| | | | | 307/328 |

FOREIGN PATENT DOCUMENTS

| JP | 2013-018152 A | 1/2013 |
|---|---|---|
| JP | 5855685 B | 2/2016 |
| JP | 2016127702 A | 7/2016 |
| JP | 2016144354 A | 8/2016 |
| JP | 2016171699 A | 9/2016 |

\* cited by examiner

DC POWER
ACCUMULATED
IN DC LINK

REGENERATIVE POWER
CONSUMED BY RESISTANCE

DC POWER
SUPPLIED TO
DC/DC CONVERTER
0

MOTOR DRIVE DEVICE INCLUDING SHARED CONVERTER

BACKGROUND OF THE INVENTION

1. Field of the Invention

The present invention relates to a motor drive device which converts AC power supplied from an AC power source side to DC power and outputs the same to a DC link and then further converts the same to AC power for driving a motor and supplies the same to the motor.

2. Description of the Related Art

In a motor drive device which drives a servo motor (hereinafter, occasionally referred to simply as "motor") in a machine tool, a forming machinery, an injection molding machine, an industrial machinery, or a robot of any of various types, AC power supplied from an AC power source side is once converted to DC power which is then further converted to AC power, and such AC power is used as drive power for the servo motor provided to each drive axis.

For example, as disclosed in Japanese Unexamined Patent Publication (Kokai) No. 2013-18152, in general, the motor drive device that supplies drive power to the servo motor is constituted by two systems including a servo amplifier which generates drive power for rotationally driving the servo motor and a control power source which generates drive power for a control system of the servo amplifier.

FIG. 19 is a diagram illustrating a configuration of a conventional motor drive device which supplies drive power to a motor. In general, the motor drive device which supplies drive power to a servo motor 2 is constituted by a servo amplifier 1001 that generates drive power for rotationally driving the servo motor 2 and a control power source 1002 that generates drive power for a control system of the servo amplifier 1001. Note that in an example as illustrated in FIG. 19, with respect to an AC power source 3, single-phase alternating current is employed by way of example, but three-phase alternating current may be employed as well.

The servo amplifier 1001 includes a converter 111-1 which converts AC power supplied from an AC power source 3 side to DC and outputs the same and an inverter 112 which is connected to a DC link that is a DC output side of the converter 111-1 and performs power conversion between DC power of the DC link and AC power that is drive power or regenerative power of the servo motor 2, and controls a speed, a torque, or a position of a rotor of the servo motor 2 which is connected to an AC output side of the inverter 112. The DC link which connects the DC output side of the converter 111-1 and a DC input side of the inverter 112 to each other is provided with a DC link capacitor 113-1. The DC link capacitor 113-1 is configured to have a function as a smoothing capacitor for restraining a ripple component of a DC output of the converter 111-1 and is configured to be capable of accumulating DC power. The DC link capacitor 113-1 is to be initially charged (also referred to as "precharged") immediately after the motor drive device which supplies drive power to the servo motor 2 starts and before the servo motor 2 starts driving (i.e., before a power conversion operation by the inverter 112 starts) and thus an initial charge unit 25-1 therefor is provided. The inverter 112 is provided in the same number as the number of the servo motor 2 to supply drive power separately to each servo motor 2 provided to correspond to a plurality of drive axes and drive and control the servo motor. On the other hand, the converter 111-1 in the servo amplifier 1001 is often provided single for the plurality of inverters 112 for the purpose of reduction in cost and space occupied. Note that in FIG. 19, the number of the servo motor 2 is one for the sake of clarity in the drawing and accordingly the number of the inverter 112 is one. In the servo amplifier 1001, to cut off supply of AC power to the converter 111-1 during an emergency stop, at an AC input side of the converter 111-1, a magnetic contactor 201 is provided.

On the other hand, the control power source 1002 is to always generate drive power for the control system of the servo amplifier 1001 independently of a normal time and an emergency stop time and is thus provided in a system other than that of the servo amplifier 1001 in order that supply of AC power is not cut off by the magnetic contactor 201. The control power source 1002 includes a converter 111-2 which converts AC power supplied from the AC power source 3 side to DC power and outputs the same and a DC/DC converter 114 which is connected to a DC link that is a DC output side of the converter 111-2 and converts DC power of the DC link to DC power for the control power source 1002 and outputs the same. Normally, the DC/DC converter 114 converts a DC voltage of the DC link to DC voltages of 3.3 (V), 5 (V), and 24 (V). The DC link which connects the DC output side of the converter 111-2 and a DC input side of the DC/DC converter 114 to each other is also provided with a DC link capacitor 113-2, and an initial charge unit 25-2 for initially charging the DC link capacitor 113-2 is provided.

Further, as methods of cutting off supply of AC power to a converter during an emergency stop, for example, as disclosed in Japanese Patent No. 5855685, there is also a method using, other than the magnetic contactor as described above, a safe torque off (STO) function which satisfies requirements of functional safety standard IEC61800-5-2. The safe torque off function is a function of forcibly turning off a switching drive signal of a switching element in a servo amplifier using a hardware circuit, thereby cutting off power supply to a motor and turning off an output torque of the motor.

In the motor drive device as described above, the servo amplifier is provided with the magnetic contactor which cuts off supply of AC power to the converter during an emergency stop, while the control power source is to always generate drive power for the control system of the servo amplifier independently of a normal time and an emergency stop time so that the servo amplifier and the control power source are each to be separately provided with the converter. Accordingly, the initial charge unit and the DC link capacitor which are provided to the DC output side of the converter are also to be provided for each of the servo amplifier and the control power source. Consequently, there has been a problem that enlargement of the motor drive device, increase of installation cost and operating cost, and increase of power consumption may not be avoided.

SUMMARY OF INVENTION

Thus, there has been desired a low-power consuming, small, and low-cost motor drive device which converts AC power supplied from an AC power source side to DC power and outputs the same to a DC link and then further converts the same to AC power for driving a motor and supplies the same to the motor.

In one aspect of the present disclosure, a motor drive device includes: one converter which performs power conversion between AC power of an AC power source side and DC power of a DC link which is a DC side; a DC link capacitor provided to the DC link; at least one inverter connected to the DC link, each switching element being controlled to be turned on/off based on a switching drive signal supplied, to perform power conversion between DC power of the DC link and AC power which is drive power or regenerative power of a motor; a DC/DC converter which is connected to the DC link, converts DC power of the DC link to DC power for a control power source, and outputs the same; a servo motor control circuit which outputs each switching drive signal for controlling power conversion of the inverter and operates using, as drive power, DC power for the control power source outputted by the DC/DC converter; a torque cut-off circuit which allows supply of each switching drive signal to each switching element while receiving a safety signal, and cuts off supply of each switching drive signal to each switching element, to stop power conversion of the inverter when not receiving a safety signal; and a safety monitor circuit which stops transmission of the safety signal to the torque cut-off circuit when an abnormality of the torque cut-off circuit occurs.

Herein, the safety monitor circuit may stop transmission of the safety signal to the torque cut-off circuit when receiving an emergency stop signal from an upper-level controller.

Further, the safety monitor circuit may determine whether or not an abnormality of the torque cut-off circuit occurs based on the safety signal transmitted to the torque cut-off circuit and a state signal indicating a state of the torque cut-off circuit, the state signal being received from the torque cut-off circuit.

Further, when an occurrence of an abnormality of the AC power source is detected, the servo motor control circuit may control power conversion of the inverter in such a manner as to gradually decelerate the motor connected to the inverter.

Further, the motor drive device may further include a DC circuit constituted by at least one of a power factor improvement circuit, a voltage boost circuit, a voltage step-down circuit, a regenerative resistance, and an initial charge unit for initially charging the DC link capacitor.

Further, the motor drive device may further include a DC circuit breaker connected to the DC link and a control circuit for such a control as to cut off a current path of the DC circuit breaker after power conversion of the inverter is stopped by the torque cut-off circuit.

Further, the motor drive device may further include an AC circuit connected to the AC power source side of the converter and constituted by at least one of an EMC filter, a breaker, a transformer, and an AC circuit breaker.

BRIEF DESCRIPTION OF THE DRAWINGS

The present invention will be understood more clearly by referring to the following accompanying drawings.

DETAILED DESCRIPTION

Figure 1:
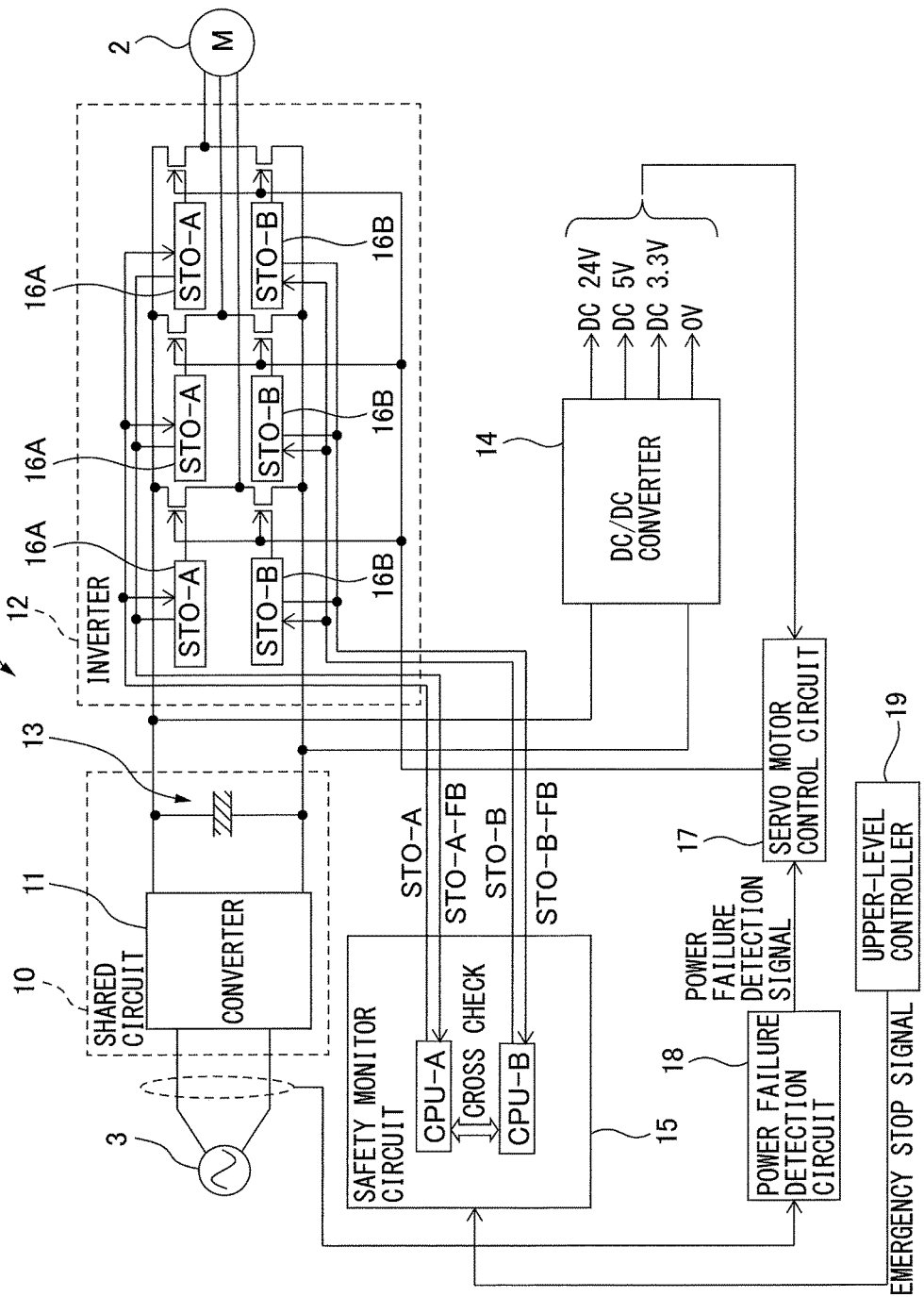
FIG. 1 is a diagram illustrating a configuration of a motor drive device according to an embodiment of the present disclosure.

Next, embodiments of the present disclosure will be described with reference to the drawings. In the following drawings, similar members are provided with similar reference signs. To facilitate understanding, these figures are suitably changed in scale. Further, embodiments as illustrated in the drawings are one example so as to carry out one aspect of the present disclosure, and such embodiments are not limitative.

FIG. 1 is a diagram illustrating a configuration of a motor drive device according to an embodiment of the present disclosure. Hereinafter, it is to be understood that a component provided with the same reference sign in different drawings designates the component having the same function. To a commercial AC input side of a motor drive device 1, an AC power source 3 is connected, and to an AC motor side of the motor drive device 1, a servo motor 2 is connected. Herein, the motor drive device 1 which drives and controls one motor 2 will be described, but the number of the servo motor 2 driven and controlled by the motor drive device 1 is not to particularly limit the present embodiment but may be one or plural. Further, in the embodiment as described below, the AC power source 3 and the servo motor 2 which are connected to the motor drive device 1 are configured to be single-phase and three-phase, respectively, but the number of phases is not to particularly limit the present embodiment but, for example, a single-phase configuration may be employed. In addition, the type of the servo motor 2 driven by the motor drive device 1 is also not to particularly limit the present embodiment but, for example, an induction motor and a synchronous motor may be employed.

As illustrated in FIG. 1, the motor drive device 1 according to the present embodiment includes a converter 11, an inverter 12, a DC link capacitor 13, a DC/DC converter 14, a safety monitor circuit 15, torque cut-off circuits 16A, 16B (hereinafter, occasionally provided with the reference sign 16 collectively), and a servo motor control circuit 17. Further, the motor drive device 1 optionally includes a power failure detection circuit 18 which detects a power source abnormality, such as a power failure, an open phase, and a short circuit of the AC power source 3. Note that the servo motor control circuit 17 is connected to an upper-level controller 19, such as a programmable logic controller (PLC) which is a robot controller, and a line controller.

The motor drive device 1 according to the present embodiment includes one converter 11 and also one DC link capacitor 13 provided to a DC link which is a DC output side of the converter 11. The inverter 12 which constitutes a servo amplifier that generates drive power for rotationally driving the servo motor 2 and the DC/DC converter 14 which constitutes a control power source that generates drive power for a control system of the servo amplifier are separately configured, while a DC input side of the inverter 12 and a DC input side of the DC/DC converter 14 are both connected to the same DC link, and consequently a circuit constituted by the converter 11 and the DC link capacitor 13 is configured as a shared circuit (provided with the reference sign 10). In other words, in the motor drive device 1 according to the present embodiment, the converter 11 and the DC link capacitor 13 are not provided to each of the servo amplifier and the control power source, separately, similarly to conventional examples, but provided as the shared circuit 10 so that the size of the motor drive device 1 can be reduced and installation cost and operating cost can be reduced. Hereinafter, each component of the motor drive device 1 will be described.

The converter 11 performs power conversion between AC power of an AC power source 3 side and DC power of the DC link which is a DC side. Examples of the converter 11 include a diode rectifier circuit, a 120° conduction type rectifier circuit, a pulse width modulation (PWM) control type rectifier circuit internally provided with a switching element, and the like. When the converter 11 is a diode rectifier circuit, alternating current supplied from the AC power source 3 side is rectified and direct current is outputted to the DC link which is a DC side. When the converter 11 is a 120° conduction type rectifier circuit or a PWM control type rectifier circuit, the converter 11 can be realized as a power converter capable of both AC/DC and DC/AC conversion which converts AC power supplied from the AC power source 3 side to DC power and outputs the same to the DC side and, during motor deceleration, converts DC power supplied from the DC link to AC power and outputs the same to the AC power source 3 side. When the converter 11 is a PWM control type rectifier circuit, the converter 11 is consisted by a bridge circuit of a switching element and a diode connected in reverse parallel to the same. In such a case, examples of the switching element include an insulated gate bipolar transistor (IGBT), a thyristor, a gate turn-off (GTO), a transistor, and the like, but the type of the switching element itself is not to limit the present embodiment and the other switching elements may be employed as well. When the converter 11 is, for example, a PWM control type rectifier, a switching operation of the switching element thus internally provided is controlled by a PWM control signal in such a manner as to generate AC power having a power factor to be 1 and maintain a DC voltage applied to both ends of the DC link capacitor 13 to be a desired value, and a powering operation (conversion operation) to convert AC power to DC power or a regenerative operation (inversion operation) to convert DC power to AC power is performed. While regenerative power is generated in the motor 2 when the motor 2 is decelerated by a control of the motor drive device 1, a switching operation of the switching element thus internally provided is controlled by a PWM control signal and the converter 11 performs a regenerative operation (inversion operation) to convert DC power to AC power so that regenerative energy returned through the inverter 12 can be returned further to the AC source 3 side.

The DC link which connects the DC output side of the converter 11 and the DC input side of the inverter 12 to each other is also provided with the DC link capacitor (also referred to as smoothing capacitor) 13. The DC link capacitor 13 has a function of restraining a ripple component of a DC output of the converter 11 and also a function of accumulating DC power.

The inverter 12 is connected to the DC link and each switching element is controlled to be turned on/off based on a switching drive signal supplied, thereby performing power conversion between DC power of the DC link and AC power which is drive power or regenerative power of the servo motor 2. The inverter 12 is consisted by a bridge circuit of a switching element and a diode connected in reverse parallel to the same, and each switching element is controlled to be turned on/off based on, e.g., a PWM control process. In the present embodiment, the servo motor 2 connected to the motor drive device 1 is configured to be three-phase so that the inverter 12 is configured as a three-phase bridge circuit. Hereinafter, a switching element of an upper side arm and a switching element of a lower side arm of the bridge circuit will be referred to as "upper side arm switching element" and "lower side arm switching element", respectively. Examples of the switching elements include an IGBT, a thyristor, a GTO, a transistor, and the like, but the type of the switching elements itself is not to limit the present embodiment and the other switching elements may be employed as well. The inverter 12 allows an internal switching element to operate in a switching manner based on a switching drive signal received from the servo motor control circuit 17 as described below and converts DC power supplied from the converter 11 through the DC link to AC power having a voltage and frequency desired for driving the servo motor 2 (inversion operation). Thereby, the servo motor 2 is configured to operate based on AC power having a variable voltage and frequency as supplied. Further, while regenerative power is generated when the servo motor 2 is decelerated, based on a switching drive signal received from the servo motor control circuit 17, AC regenerative power generated in the servo motor 2 is converted to DC power which is then returned to the DC link (conversion operation). Note that the inverter 12 is provided in the same number as the number of the servo motor 2 to supply drive power separately to each servo motor 2 provided to correspond to a plurality of drive axes and drive and control the servo motor. In an example as illustrated, the number of the servo motor 2 is one for the sake of clarity in the drawing and accordingly the number of the inverter 12 is one.

The DC/DC converter 14 is connected to the DC link, converts DC power of the DC link to DC power for the control power source, and outputs the same. The DC/DC converter 14 converts a DC voltage of the DC link to DC voltages of, e.g., 3.3 (V), 5 (V), and 24 (V). DC power outputted by the DC/DC converter 14 is supplied as drive power for an operation of the servo motor control circuit 17 and the other circuits. For example, 3.3 (V) and 5 (V) are used for an operation of a control system, such as the servo motor control circuit 17, and 24 (V) is used for an operation of an electromagnetic brake (unillustrated) provided to the servo motor 2 and the other control systems.

The torque cut-off circuits 16A, 16B have a safe torque off (STO) function which satisfies requirements of functional safety standard IEC61800-5-2. The torque cut-off circuits 16A, 16B allow supply of each switching drive signal to each switching element in the inverter 12 while receiving a safety signal from the safety monitor circuit 15 as described below. In other words, while the torque cut-off circuits 16A, 16B receive a safety signal, power conversion by the inverter 12 is valid, and the inverter 12 allows an internal switching element to operate in a switching manner based on a switching drive signal received from the servo motor control circuit 17 and performs an inversion operation of converting DC power supplied from the converter 11 through the DC link to AC power having a voltage and frequency desired for driving the servo motor 2 or a conversion operation of converting AC regenerative power generated in the servo motor 2 to DC power and returning the same to the DC link. On the other hand, the torque cut-off circuits 16A, 16B cuts off supply of a switching drive signal to each switching element in the inverter 12 by the servo motor control circuit 17, thereby invalidating (stopping) power conversion of the inverter 12 when not receiving a safety signal from the safety monitor circuit 15. The safe torque off (STO) function will be described in detail later.

The safety monitor circuit 15 transmits a safety signal to the torque cut-off circuits 16A, 16B during a normal time, while always monitoring whether or not an abnormality of the torque cut-off circuits 16A, 16B themselves as described above occurs, and stops transmission of a safety signal to the torque cut-off circuits 16A, 16B when determining that an abnormality of the torque cut-off circuit 16A or 16B occurs. Further, the safety monitor circuit 15 stops transmission of a safety signal to the torque cut-off circuit 16 and invalidates power conversion of the inverter 12 also when receiving an emergency stop signal from the upper-level controller 19. Thus, when the safety monitor circuit 15 detects that an abnormality of the torque cut-off circuit 16 (16A and/or 16B) occurs and when the safety monitor circuit 15 receives an emergency stop signal from the upper-level controller 19, the safety monitor circuit 15 stops transmission of a safety signal to the torque cut-off circuits 16A, 16B, whereby the torque cut-off circuits 16A, 16B no longer receive a safety signal from the safety monitor circuit 15 and accordingly cut off supply of a switching drive signal to each switching element in the inverter 12 by the servo motor control circuit 17, and as a result, power conversion of the inverter 12 stops. The safe monitor circuit 15 will be described in detail later.

Between the safety monitor circuit 15 and the torque cut-off circuit 16, an electric connection is made in a wired or wireless manner. As a modified example thereof, the safety monitor circuit 15 and the torque cut-off circuit 16 may be connected to each other through a communication network in a system in which operations of a plurality of motor drive devices are managed through a network. Such a system has an advantage in high flexibility of a device design that, for example, the safety monitor circuit 15 can be disposed at a place distant from the torque cut-off circuit 16 and the inverter 12.

The servo motor control circuit 17 controls power conversion of the inverter 12 in such a manner that the servo motor 2 connected to the inverter 12 outputs drive power for performing a desired rotational drive (acceleration, deceleration, constant speed, stop, and the like). The servo motor control circuit 17 operates using, as drive power, DC power for the control power source outputted by the DC/DC converter 14. In the present embodiment, the inverter 12 is configured to be a PWM inverter by way of example, and accordingly, the servo motor control circuit 17 compares a motor drive command and a triangular wave carrier signal having a certain carrier frequency, generates a switching drive signal for controlling a switching operation of the switching element in the PWM inverter which is the inverter 12, and supplies the same to each switching element in the inverter 12. In the inverter 12, each switching element is controlled to be turned on/off based on the switching drive signal supplied, and AC power having a waveform and frequency required for the servo motor 2 to operate in accordance with a motor drive command is outputted. Note that a process of generating a motor drive command generated in the servo motor control circuit 17 does not limit the present embodiment, but a known process may be employed. The motor drive command is generated as a motor drive command to control a speed, a torque, or a position of a rotor of the servo motor 2 using, e.g., an operation program of the servo motor 2, alternating current or an AC voltage of an AC output side of the inverter 12, and/or a rotation speed of the servo motor 2 to command a powering operation (inversion operation) to convert DC power to AC power or a regenerative operation (conversion operation) to convert AC power to DC power.

The power failure detection circuit 18 detects a power source abnormality, such as a power failure, an open phase, and a short circuit of the AC power source 3. A process of detecting a power source abnormality itself is not to limit the present embodiment, but a known process may be employed. For example, it may be configured to determine that an abnormality (power failure) occurs when a state in which (an amplitude) of an AC voltage value of an AC input side of the converter 11 is less than a power failure voltage threshold value continues over a power failure time threshold value or more. Further, for example, the power failure detection circuit 18 may be configured in such a manner as to detect a short circuit accident of the AC input side of the converter 11 using a known process. When the power failure detection circuit 18 detects an occurrence of an abnormality of the AC power source 3, the servo motor control circuit 17 controls AC power outputted through power conversion of the inverter 12 in such a manner as to gradually decelerate the motor connected to the inverter 12.

Thus, according to the present embodiment, the converter 11 and the DC link capacitor 13 are not provided to each of the servo amplifier and the control power source, separately, similarly to conventional examples, but provided as the shared circuit 10. The inverter 12 which constitutes the servo amplifier that generates drive power for rotationally driving the servo motor 2 and the DC/DC converter 14 which constitutes the control power source that generates drive power for the control system of the servo amplifier are separately configured, while the DC input side of the inverter 12 and the DC input side of the DC/DC converter 14 are both connected to the same DC link, and consequently the circuit constituted by the converter 11 and the DC link capacitor 13 is configured as the shared circuit 10.

Subsequently, the safety monitor circuit 15 and the torque cut-off circuits 16A, 16B will be described further in detail with reference to FIGS. 1-3.

Figure 2:
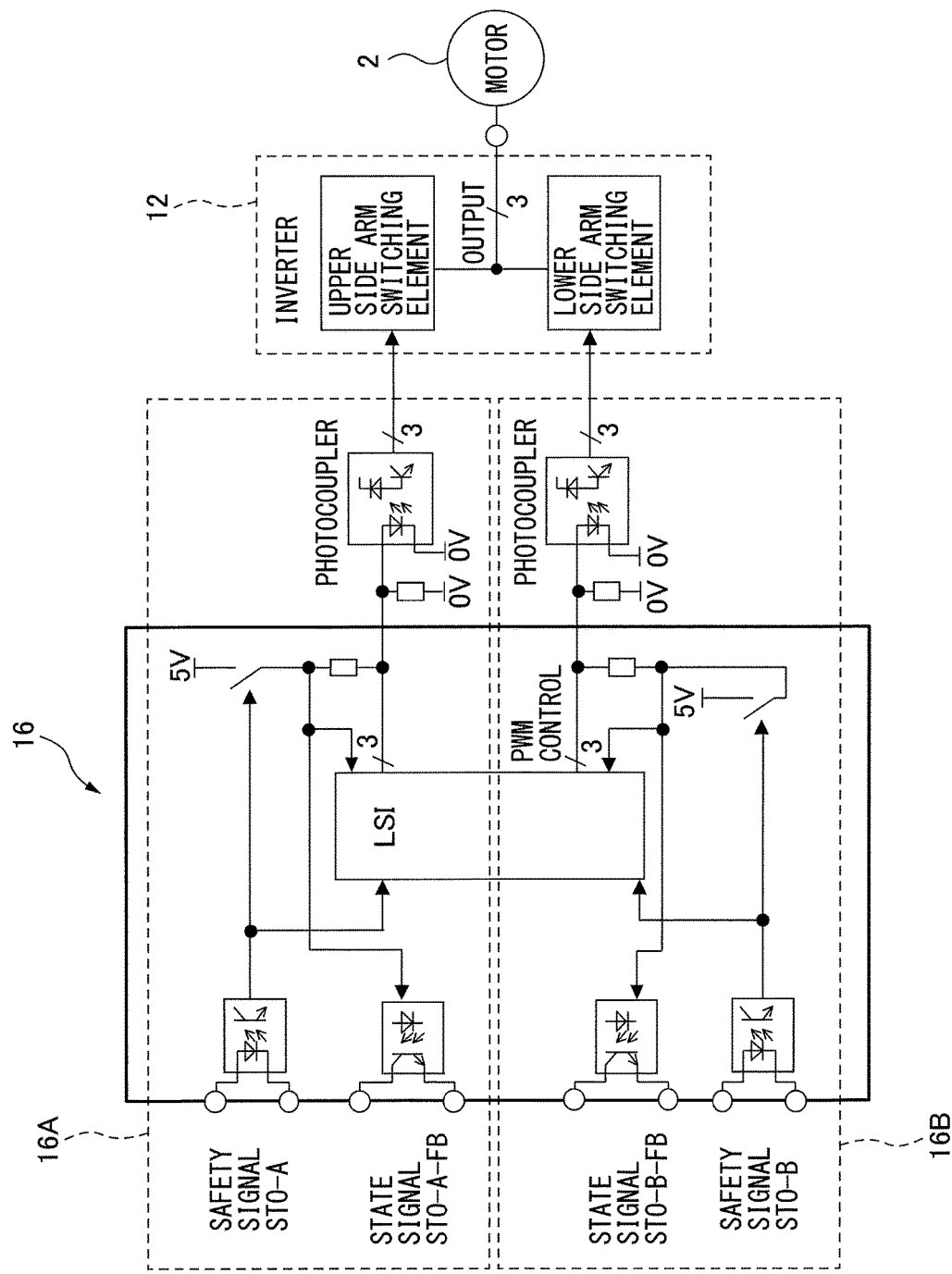
FIG. 2 is a block diagram illustrating a configuration of a torque cut-off circuit.
Figure 3:
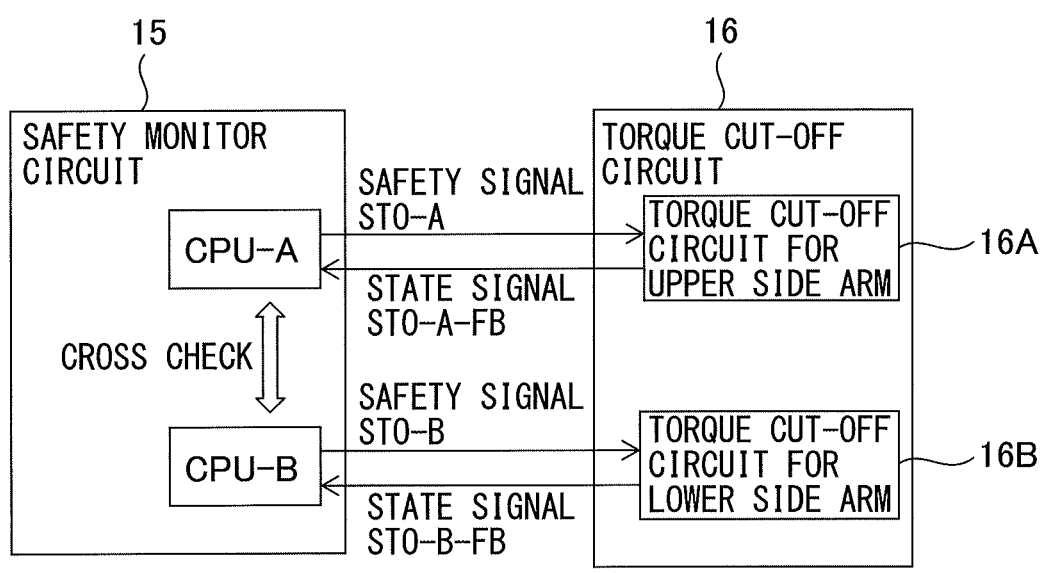
FIG. 3 is a block diagram illustrating a relationship between a safety monitor circuit and the torque cut-off circuit.

FIG. 2 is a block diagram illustrating a configuration of the torque cut-off circuit. Further, FIG. 3 is a block diagram illustrating a relationship between the safety monitor circuit and the torque cut-off circuit. The torque cut-off circuits 16A, 16B (collectively provided with the reference sign 16) have a safe torque off (STO) function which satisfies requirements of functional safety standard IEC61800-5-2. With respect to input and output signals in the safe torque off function, it is configured that a safety signal to an upper side arm switching element of the inverter 12 (safety input signal) is STO-A, a state signal fed back from the upper side arm switching element (EDM output signal) is STO-A-FB, a safety signal to a lower side arm switching element of the inverter 12 (safety input signal) is STO-B, and a state signal fed back from the lower side arm switching element (EDM output signal) is STO-B-FB. The safety monitor circuit 15 includes, as an arithmetic processing device thereof, a CPU-A for the upper side arm switching element and a CPU-B for the lower side arm switching element and cross-checks each arithmetic processing content of the CPU-A and the CPU-B, which enhances the reliability of safety monitoring. The safety monitor circuit 15 transmits the safety signal STO-A to the torque cut-off circuit 16A and transmits the safety signal STO-B to the torque cut-off circuit 16B in a state in which the servo motor 2 is operable, thereby validating power conversion of the inverter 12. Further, the safety monitor circuit 15 always compares the safety signal STO-A and the state signal STO-A-FB from the torque cut-off circuit 16A and always compares the safety signal STO-B and the state signal STO-B-FB from the torque cut-off circuit 16B, thereby monitoring whether or not an abnormality of the torque cut-off circuits 16A, 16B themselves occurs. As a result of comparison in the safety monitor circuit 15, when the safety signal STO-A and the state signal STO-A-FB corresponds to each other and the safety signal STO-B and the state signal STO-B-FB corresponds to each other, it is determined that the torque cut-off circuit 16 is normal. On the other hand, when at least one of the safety signal STO-A and the state signal STO-A-FB and the safety signal STO-B and the state signal STO-B-FB fails to correspond to each other, it is determined that an abnormality of the torque cut-off circuit 16 occurs, transmission of the safety signals to the torque cut-off circuit 16 is stopped, and power conversion of the inverter 12 is invalidated.

When the safety monitor circuit 15 detects an occurrence of an abnormality of the torque cut-off circuit 16 and receives an emergency stop signal from the upper-level controller 19, the safety monitor circuit 15 stops transmission of a safety signal to the torque cut-off circuits 16A, 16B. The torque cut-off circuits 16A, 16B no longer receive a safety signal from the safety monitor circuit 15 and accordingly the torque cut-off circuit 16A cuts off supply of a switching drive signal to the upper side arm switching element of the inverter 12, and the torque cut-off circuit 16B cuts off supply of a switching drive signal to the lower side arm switching element of the inverter 12. Thereby, power supply to the servo motor 2 is cut off and an output torque of the servo motor is turned off. Thus, according to the present embodiment, when the safety monitor circuit 15 detects an occurrence of an abnormality of the torque cut-off circuit 16 and receives an emergency stop signal from the upper-level controller 19, the torque cut-off circuits 16A, 16B perform the above operation, thereby turning off an output torque of the servo motor 2 to which power supply is cut off so that providing in a conventional manner to the AC input side of the converter 11 a magnetic contactor for cutting off supply of AC power to the converter 11 during an emergency stop is unnecessary. The control power source including the DC/DC converter 14 is configured to always generate drive power for the control system of the servo amplifier (e.g., the servo motor control circuit 17), while according to the present embodiment, providing to the AC input side of the converter 11 a magnetic contactor is unnecessary so that the converter 11 for supplying DC power to each of the inverter 12 which constitutes the servo amplifier and the DC/DC converter 14 which constitutes the control power source and the DC link capacitor 13 connected to the same can be shared.

As described above, according to the present embodiment, the converter 11 and the DC link capacitor 13 connected to the same are configured as the shared circuit 10 so that a circuit provided to the CC output side of the converter 11 (hereinafter, occasionally referred to simply as "DC circuit") and a circuit provided to the AC input side of the converter 11 (hereinafter, occasionally referred to simply as "AC circuit") can be also shared. Hereinafter, such features will be described with reference to FIGS. 4-11.

Figure 4:
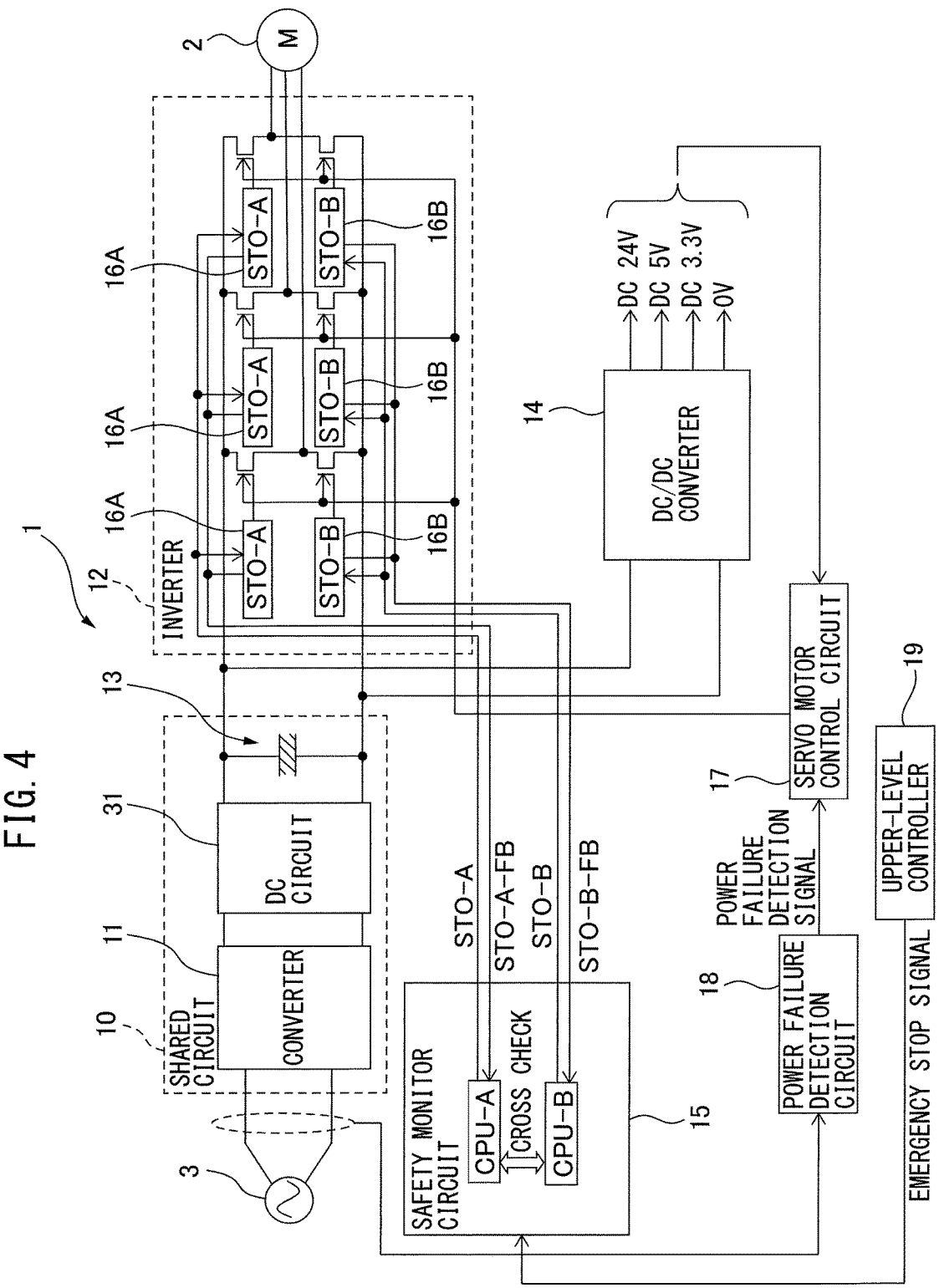
FIG. 4 is a diagram illustrating sharing of a DC circuit provided to a DC link in the motor drive device according to the embodiment of the present disclosure.
Figure 5:
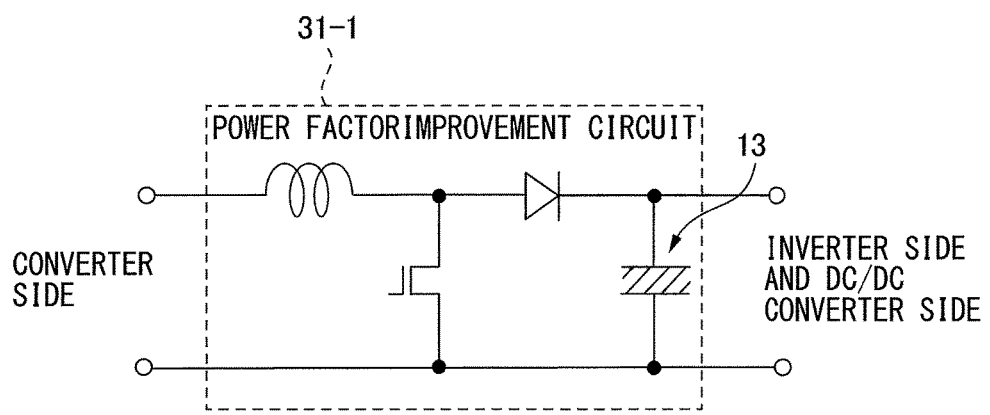
FIG. 5 is a circuit diagram illustrating a general power factor improvement circuit.
Figure 6:
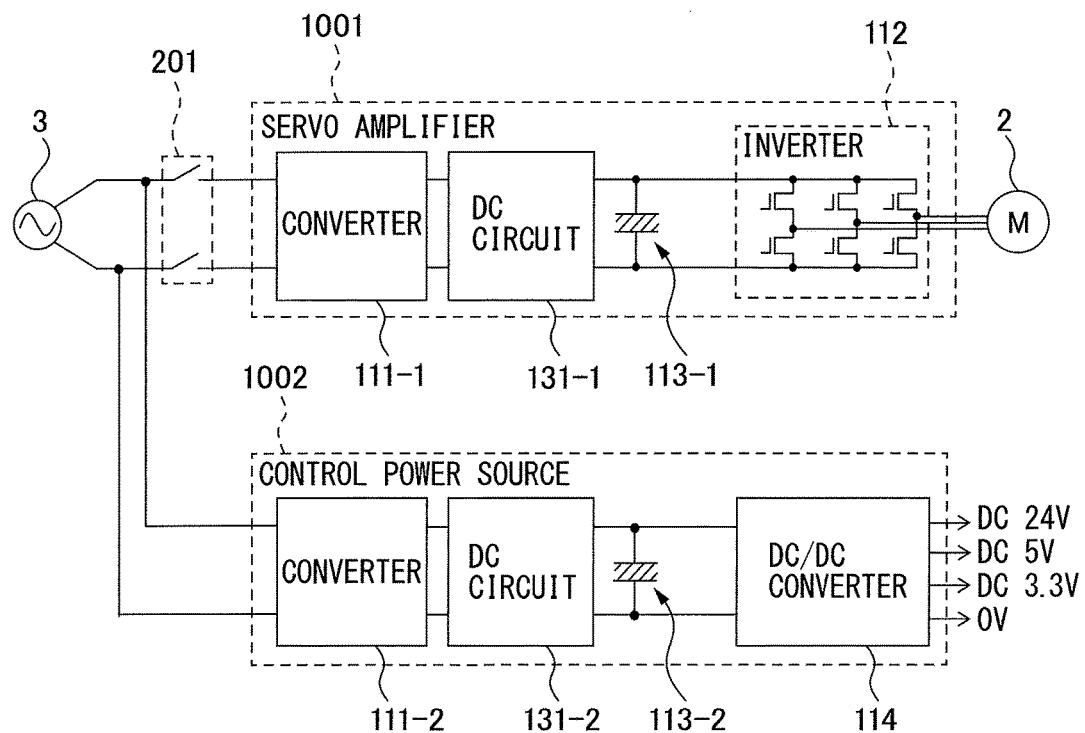
FIG. 6 is a diagram illustrating a case in which a DC circuit is provided in a conventional motor drive device as illustrated in FIG. 19.
Figure 19:
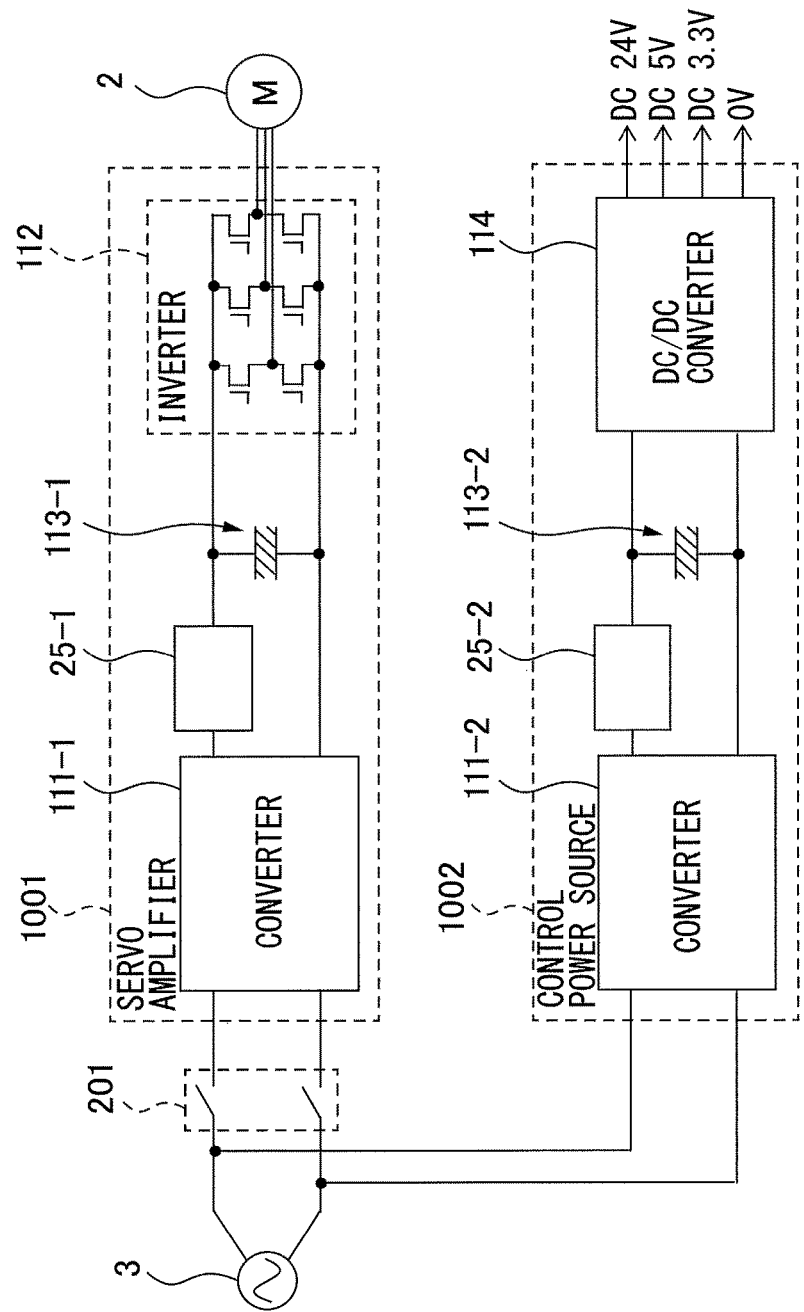
FIG. 19 is a diagram illustrating a configuration of the conventional motor drive device which supplies drive power to a motor.

FIG. 4 is a diagram illustrating sharing of a DC circuit provided to the DC link in the motor drive device according to the embodiment of the present disclosure. As illustrated in FIG. 4, since to the DC link which is the DC output side of the converter 11, each DC input of the inverter 12 and the DC/DC converter 14 is connected, a DC circuit 31 provided to the DC link can be also shared with the inverter 12 and the DC/DC converter 14. Examples of the DC circuit 31 include a power factor improvement circuit, a DC chopper circuit, such as a voltage boost circuit and a voltage step-down circuit, a regenerative resistance, an initial charge unit for initially charging the DC link capacitor 13, and the like. Note that the DC circuit 31 is not limited to only one from among a power factor improvement circuit, a voltage boost circuit, a voltage step-down circuit, a regenerative resistance, and an initial charge unit, but includes those configured to include two or more from among the same. An example of the DC circuit 31 is illustrated in FIG. 5. In other words, FIG. 5 is a circuit diagram illustrating a general power factor improvement circuit. Further, FIG. 6 is a diagram illustrating a case in which a DC circuit is provided in a conventional motor drive device as illustrated in FIG. 19. As illustrated in FIG. 6, the conventional motor drive device is constituted by the servo amplifier 1001 which generates drive power for rotationally driving the servo motor 2 and the control power source 1002 which generates drive power for the control system of the servo amplifier 1001 so that a DC link which is the DC input side of the inverter 112 and a DC link which is the DC input side of the DC/DC converter 114 are independent of each other and are thus to be each provided with a DC circuit independently (reference signs 131-1, 131-2). In contrast, according to the present embodiment, as illustrated in FIG. 4, a DC link which is the DC input side of the inverter 12 and a DC link which is the DC input side of the DC/DC converter 14 are shared with each other so that the DC circuit 31 provided to the DC link can be reduced as compared with conventional examples. Accordingly, the size of the motor drive device 1 can be reduced and installation cost and operating cost can be reduced.

Figure 7:
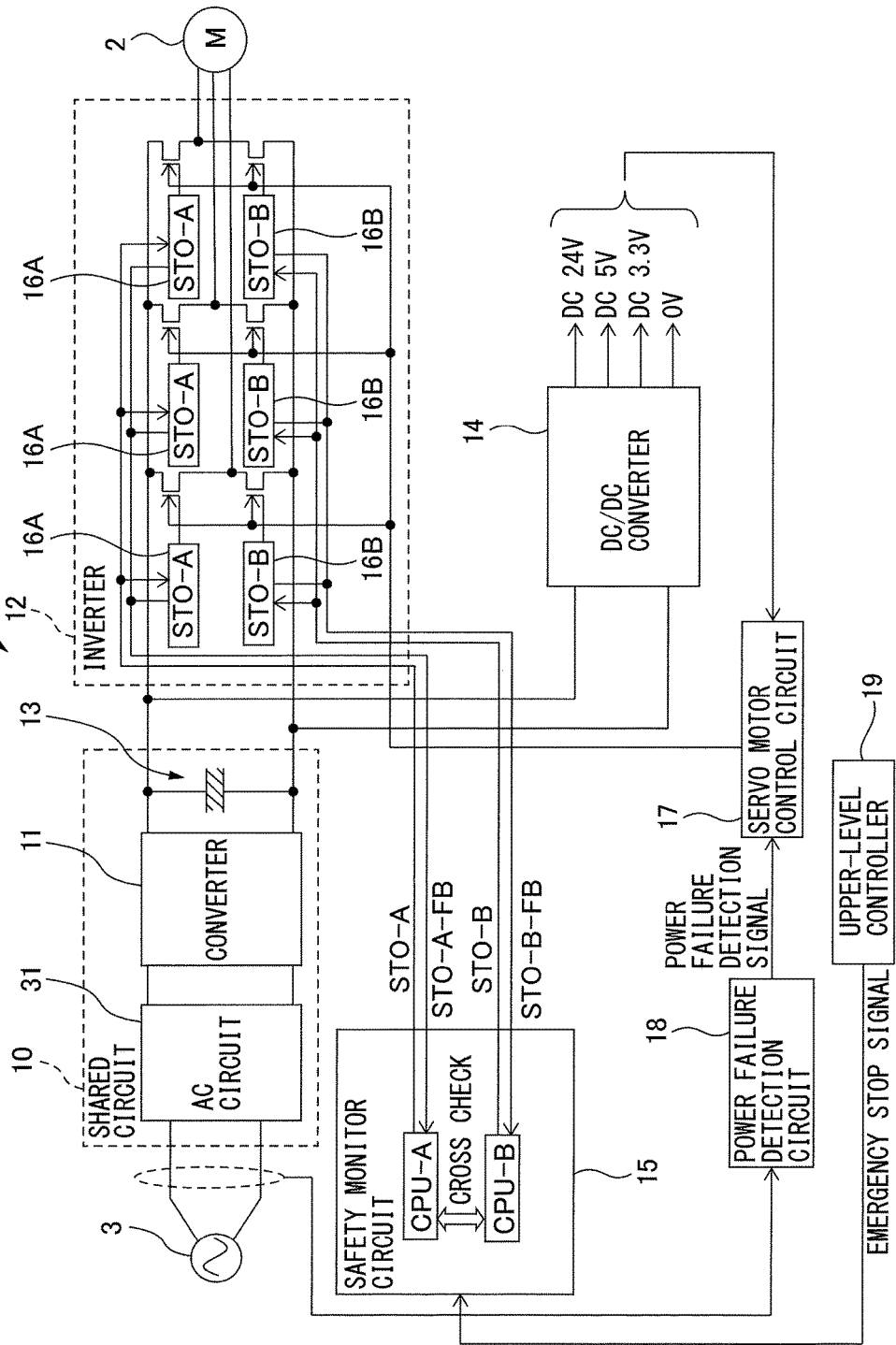
FIG. 7 is a diagram illustrating sharing of an AC circuit provided to an AC power source side in the motor drive device according to the embodiment of the present disclosure.
Figure 8:
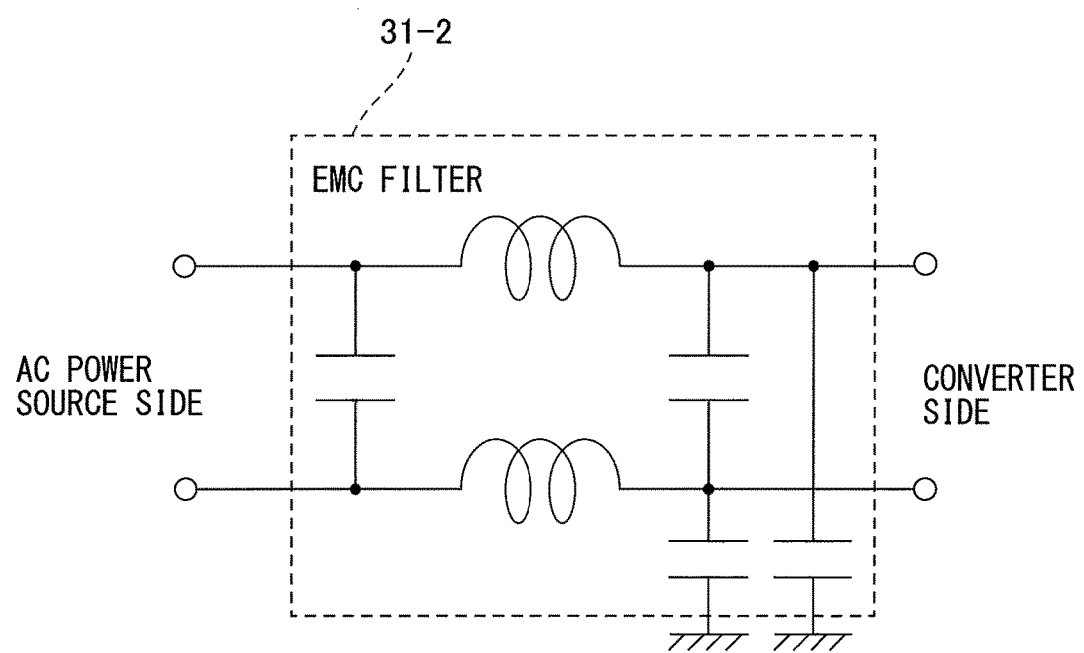
FIG. 8 is a circuit diagram illustrating a general EMC filter.

FIG. 7 is a diagram illustrating sharing of an AC circuit provided to an AC power source side in the motor drive device according to the embodiment of the present disclosure. As illustrated in FIG. 7, the converter 11 and the DC link capacitor 13 connected to the same are configured as the shared circuit 10 so that an AC circuit 32 provided to the AC input side (AC power source side) of the converter 11 can be also shared with the inverter 12 and the DC/DC converter 14. Examples of the AC circuit 32 include an EMC filter, a breaker, a transformer, an AC circuit breaker, and the like. Note that the AC circuit 32 is not limited to only one from among an EMC filter, a breaker, a transformer, and an AC circuit breaker, but includes those configured to include two or more from among the same. An example of the AC circuit 32 is illustrated in FIG. 8. In other words, FIG. 8 is a circuit diagram illustrating a general EMC filter. According to the present embodiment, as illustrated in FIG. 7, the converter 11 and the DC link capacitor 13 connected to the same are configured as the shared circuit 10 so that the AC circuit 32 provided to the AC input side of the converter 11 can be reduced as compared with conventional examples. Accordingly, the size of the motor drive device 1 can be reduced and installation cost and operating cost can be reduced.

Figure 9:
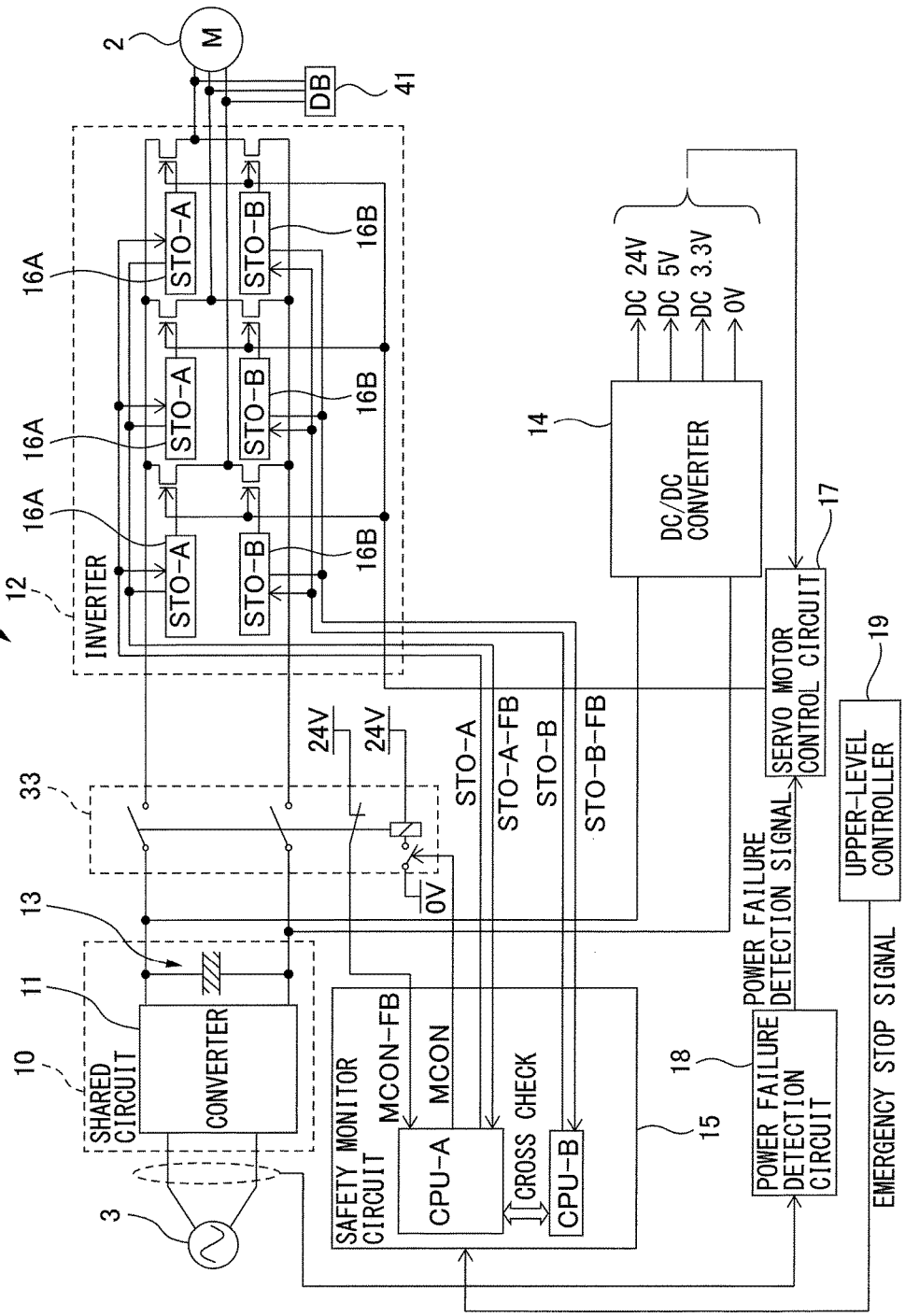
FIG. 9 is a diagram illustrating a magnetic contactor provided to the DC link in the motor drive device according to the embodiment of the present disclosure.
Figure 10:
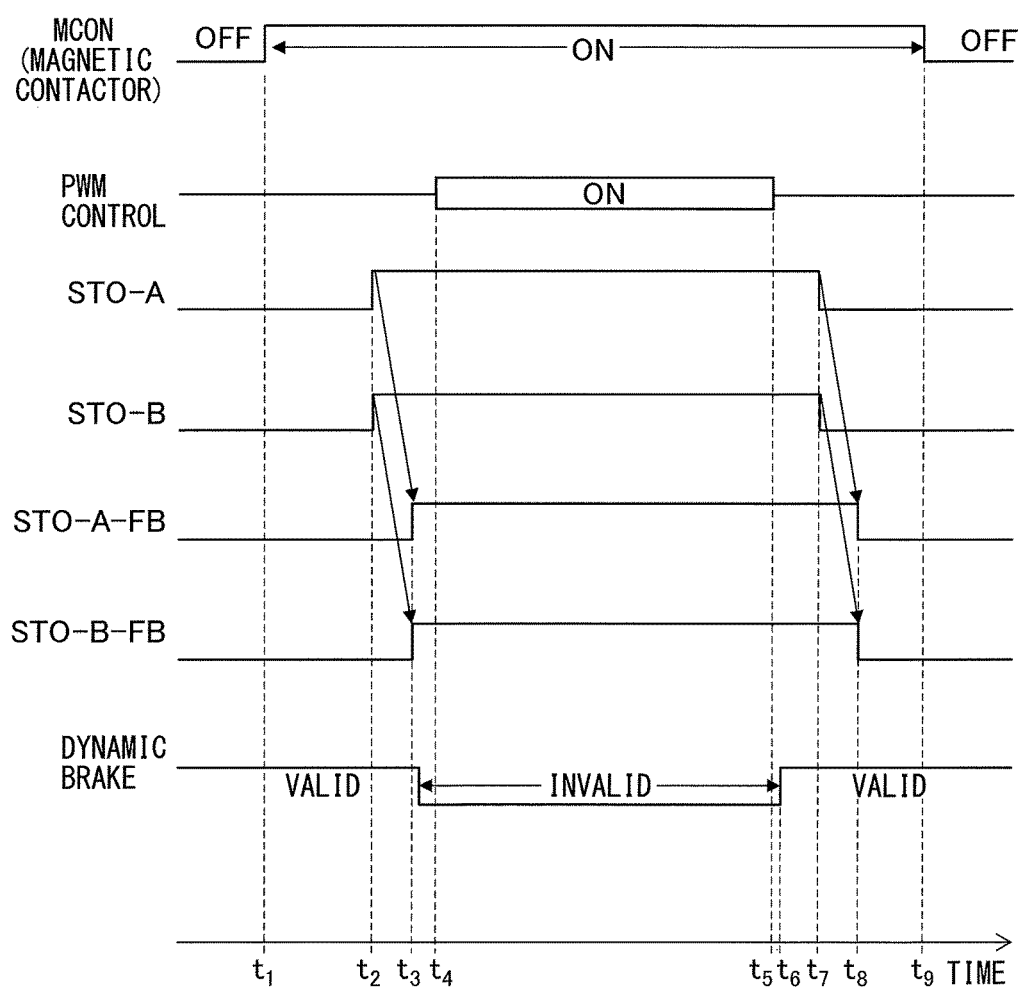
FIG. 10 is a diagram illustrating an operation of the motor drive device as illustrated in FIG. 9.

FIG. 9 is a diagram illustrating a magnetic contactor provided to the DC link in the motor drive device according to the embodiment of the present disclosure. Further, FIG. 10 is a diagram illustrating an operation of the motor drive device as illustrated in FIG. 9. The DC circuit 31 provided to the DC link as described with reference to FIG. 4 also includes a magnetic contactor 33 as illustrated in FIG. 9. The DC link is provided with the magnetic contactor 33, thereby allowing an emergency stop operation to be further reliable at the time of an occurrence of an abnormality at the AC power source 3 side, which enhances safety. The magnetic contactor 33 is controlled in such a manner as to cut off a current path (i.e., a current path on the DC link) after power conversion of the inverter 12 is stopped by the torque cut-off circuits 16A, 16B and then a DC link voltage falls below or is equal to a predetermined voltage (preferably, after current flowing in the DC link amounts to substantially zero). Such a predetermined voltage may be set to be such a low voltage that an arc does not occur at a contact point of the magnetic contactor 33 at the time of an operation of opening and closing the current path by the magnetic contactor 33. An operation of opening and closing the current path by the magnetic contactor 33 is performed after the DC link voltage falls below or is equal to a predetermined voltage, whereby an arc no longer occurs at the contact point of the magnetic contactor 33 and deterioration of the contact point can be prevented. Note that a control circuit for controlling an operation of the magnetic contactor 33 is provided, for example, in the safety monitor circuit 15. A specific operation of the magnetic contactor 33 provided to the DC link will be described further in detail in the following with reference to FIG. 10.

In FIG. 10, it is configured that in an initial state in which an operation of the servo motor 2 is not started before time $t_1$, the servo motor control circuit 17 does not operate, while a dynamic brake 41 is valid, and further, the magnetic contactor 33 is turned off. At time $t_1$, the magnetic contactor 33 is turned on. At time $t_2$, the safety monitor circuit 15 is made to start to output the safety signals STO-A and STO-B to the torque cut-off circuits 16A, 16B is started. Then, at time $t_3$, the safety monitor circuit 15 is made to start to receive the state signals STO-A-FB and STO-B-FB from the torque cut-off circuits 16A, 16B. Thereby, the safe torque off function of the torque cut-off circuits 16A, 16B becomes invalid, and as a result, a power conversion operation of the inverter 12 is made to be performable. Subsequently, between time $t_3$ and time $t_4$, the dynamic brake 41 is released. Then, at time $t_4$, the servo motor control circuit 17 starts supply of a switching drive signal to each switching element in the inverter 12. Between time $t_4$ and $t_5$, in the inverter 12, each switching element therein is controlled to be turned on/off based on a PWM control process, and accordingly, power conversion between DC power of the DC link and AC power that is drive power or regenerative power of the servo motor 2 is performed and the servo motor 2 is rotationally driven. When the safety monitor circuit 15 detects an occurrence of an abnormality of the AC power source 3 during an operation period of the servo motor 2 between time $t_4$ and $t_5$, the torque cut-off circuits 16A, 16B cut off supply of a switching drive signal to each switching element in the inverter 12 by the servo motor control circuit 17, thereby stopping power conversion of the inverter 12. At time $t_5$, to terminate rotational drive of the servo motor 2, the servo motor control circuit 17 stops supply of a switching drive signal to each switching element in the inverter 12. Then, at time $t_6$, the dynamic brake 41 is made to be valid. Thereby, the servo motor 2 falls into a state in which the brake is actuated. At time $t_7$, the safety monitor circuit 15 is made to stop supply of a switching drive signal to each switching element in the inverter 12. Then, at time $t_8$, the safety monitor circuit 15 terminates to receive the state signals STO-A-FB and STO-B-FB from the torque cut-off circuits 16A, 16B. Subsequently, when the DC link voltage falls below or is equal to a predetermined voltage (preferably, current flowing in the DC link is zero) (non-energized state), the magnetic contactor 33 is turned off (time $t_9$). An operation of opening and closing the current path by the magnetic contactor 33 is performed after the DC link voltage falls below or is equal to a predetermined voltage, whereby an arc no longer occurs at the contact point of the magnetic contactor 33 and deterioration of the contact point can be prevented.

Figure 11:
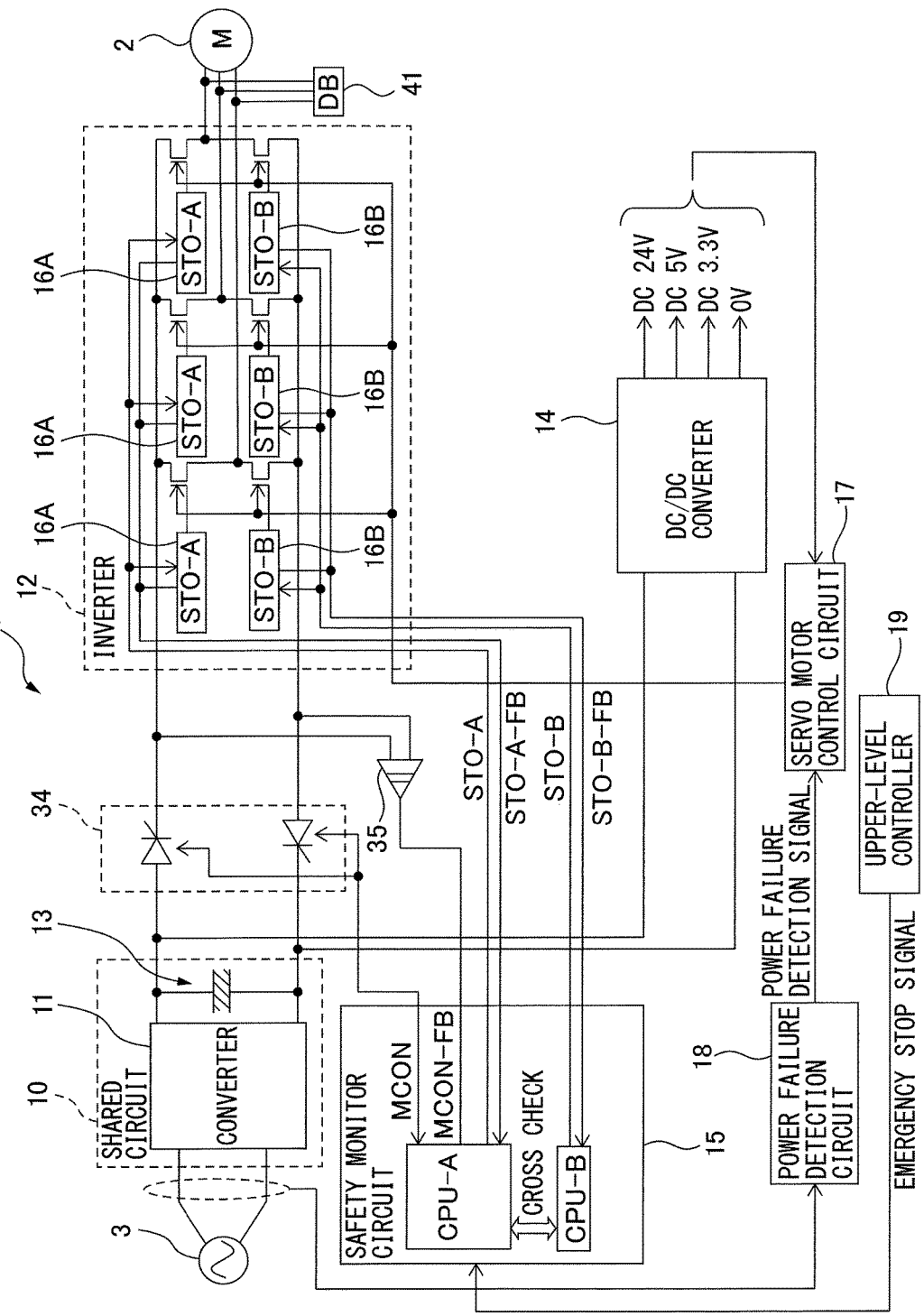
FIG. 11 is a diagram illustrating a semiconductor cut-off circuit provided to the DC link in the motor drive device according to the embodiment of the present disclosure.

FIG. 11 is a diagram illustrating a semiconductor cut-off circuit provided to the DC link in the motor drive device according to the embodiment of the present disclosure. As a DC cut-off device having a function similar to that of the magnetic contactor 33 provided to the DC link as described with reference to FIGS. 9 and 10, a semiconductor cut-off circuit 34 may be provided to the DC link to allow an emergency stop operation to be further reliable at the time of an occurrence of an abnormality at the AC power source 3 side. An operation and control of the semiconductor cut-off circuit 34 is similar to the operation and control of the magnetic contactor 33 as described with reference to FIG. 10 and thus the description is omitted. Note that in an example as illustrated in FIG. 11, to confirm whether or not the DC link voltage falls below or is equal to a predetermined voltage, an insulation amplifier 35 is used. The insulation amplifier 35 monitors the DC link voltage (i.e., voltage across the both ends of the DC link capacitor 13) and notifies a voltage as monitored to the safety monitor circuit 15.

The embodiments as described with reference to FIGS. 4-18B may be suitably combined with each other to be realized. In other words, in the motor drive device 1 according to the present embodiment, the DC circuit 31 may be provided to the DC output side of the converter 11, while the AC circuit 32 may be provided to the AC input side of the converter 11.

Subsequently, reuse of regenerative power in the motor drive device according to the present embodiment will be described with reference to FIGS. 12-18B.

Figure 12:
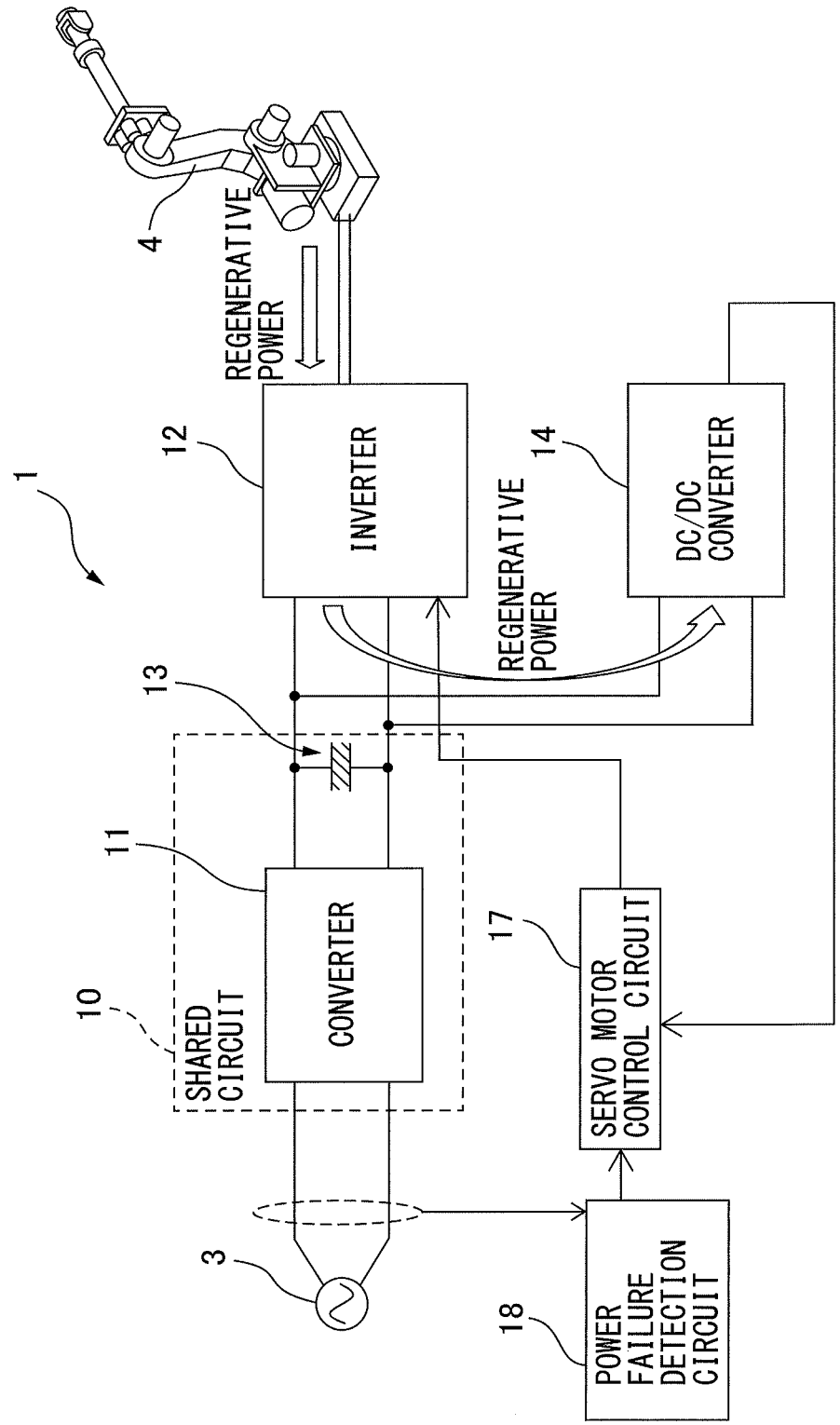
FIG. 12 is a diagram illustrating a flow of regenerative power in the motor drive device according to the embodiment of the present disclosure.
Figure 13:
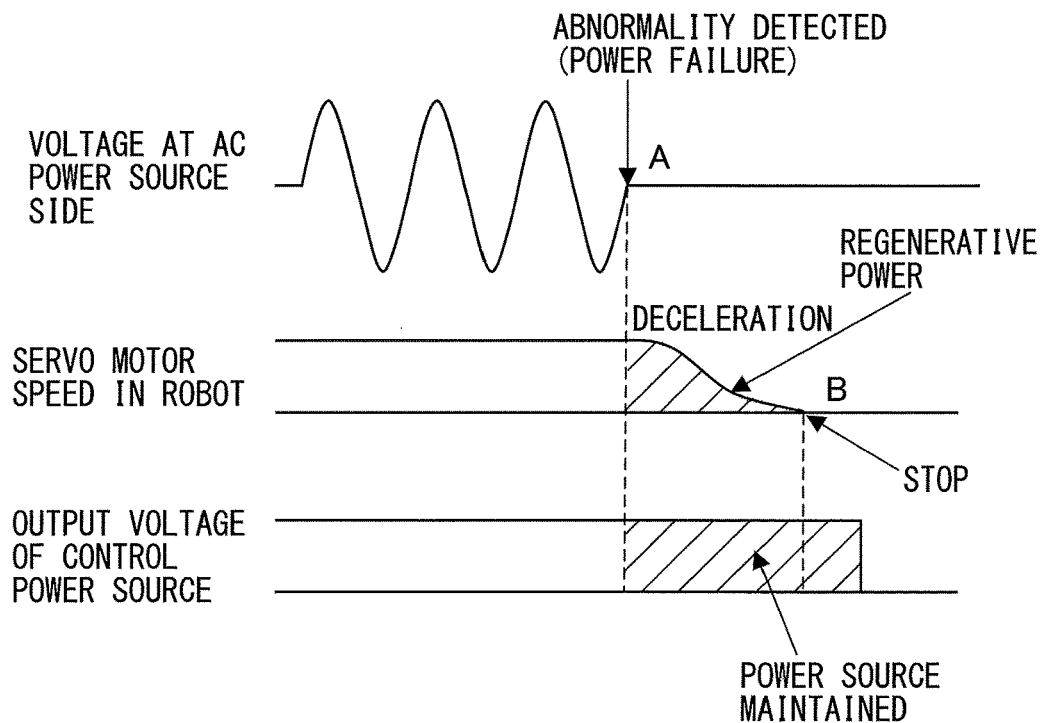
FIG. 13 is a diagram illustrating a relationship of a power source voltage, a servo motor speed, and a voltage of a control power source at the time of an occurrence of a power source abnormality (power failure) in the motor drive device according to the embodiment of the present disclosure.
Figure 14:
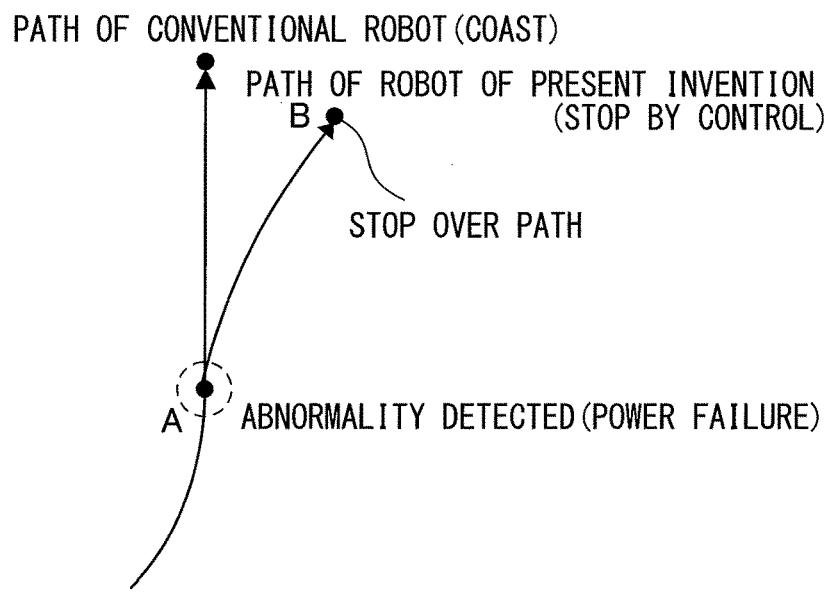
FIG. 14 is a diagram schematically illustrating a path of an operation of a robot when the relationship as illustrated in FIG. 13 is satisfied.

FIG. 12 is a diagram illustrating a flow of regenerative power in the motor drive device according to the embodiment of the present disclosure. Further, FIG. 13 is a diagram illustrating a relationship of a power source voltage, a servo motor speed, and a voltage of a control power source at the time of an occurrence of a power source abnormality (power failure) in the motor drive device according to the embodiment of the present disclosure. In addition, FIG. 14 is a diagram schematically illustrating a path of an operation of a robot when the relationship as illustrated in FIG. 13 is satisfied. In FIGS. 12-14, a case in which the motor drive device 1 according to the present embodiment drives a servo motor (unillustrated) in a robot 4 is illustrated. Note that in FIG. 12, for the sake of clarity in the drawing, illustration of the torque cut-off circuits 16A, 16B is omitted.

When the power failure detection circuit 18 detects an occurrence of an abnormality (power failure) of the AC power source 3 (at A in FIG. 13), a power failure detection signal is notified to the servo motor control circuit 17 and in response to the notification, the servo motor control circuit 17 outputs to the inverter 12 such a command that the robot 4 decelerates and stops over a predetermined path (switching drive signal). Further specifically, when receiving the power failure detection signal from the power failure detection circuit 18, the servo motor control circuit 17 outputs each switching drive signal to control power conversion of the inverter 12 in such a manner that drive power for the servo motor mounted to the robot 4 is outputted such that the robot 4 decelerates and stops over a predetermined path. Thereby, the robot 4 decelerates over a predetermined path, and each servo motor decelerates, whereby regenerative power is generated. The DC link which is the DC input side of the inverter 12 and the DC link which is the DC input side of the DC/DC converter 14 are shared with each other so that AC regenerative power generated in each servo motor in the robot 4 is converted by the inverter 12 to DC power, a part of which is inputted to the DC/DC converter 14. Since also after an abnormality of the AC power source 3 occurs (at A in FIG. 13), regenerative power is generated until the speed of the servo motor in the robot 4 amounts to zero (at B in FIG. 13), the DC/DC converter 14 can convert such regenerative power to DC power for the control power source. In other words, in the motor drive device according to the present embodiment, even after the power failure detection circuit 18 detects an occurrence of an abnormality of the AC power source 3, the DC/DC converter 14 can output DC power for the control power source while regenerative power due to deceleration of the robot 4 is supplied, and the servo motor control circuit 17 can continue to operate using such DC power as drive power. Thus, after an abnormality of the AC power source 3 occurs and until supply of DC power from the DC/DC converter 14 stops, the inverter 12 continues to receive a switching drive signal from the servo motor control circuit 17 so that the servo motor continues to be supplied with drive power, and the robot 4 driven by the servo motor can decelerate and stop over a predetermined path (FIG. 14). In other words, in the motor drive device according to the present embodiment, the DC link which is the DC input side of the inverter 12 and the DC link which is the DC input side of the DC/DC converter 14 are shared with each other so that AC regenerative power generated in the servo motor in the robot 4 which occurs after an occurrence of an abnormality of the AC power source 3 can be effectively used for an operation of the servo motor control circuit 17. In contrast, conventionally, as illustrated in FIG. 19, the DC link which is the DC input side of the inverter 112 and the DC link which is the DC input side of the DC/DC converter 114 are independent of each other so that reuse of regenerative power at the time of an occurrence of an abnormality is impossible, and consequently, a robot including, as a drive source, a servo motor driven by a conventional motor drive device immediately stops at the time of an occurrence of an abnormality (FIG. 14). Further, in the conventional motor drive device as illustrated in FIG. 19, if, after a power failure occurs, maintaining the control power source for a certain time and decelerating and stopping a robot by a control are attempted, a circuit for maintaining the control power source for a certain time is to be further provided so that the device enlarges and cost increases as compared with the present embodiment.

Figure 15:
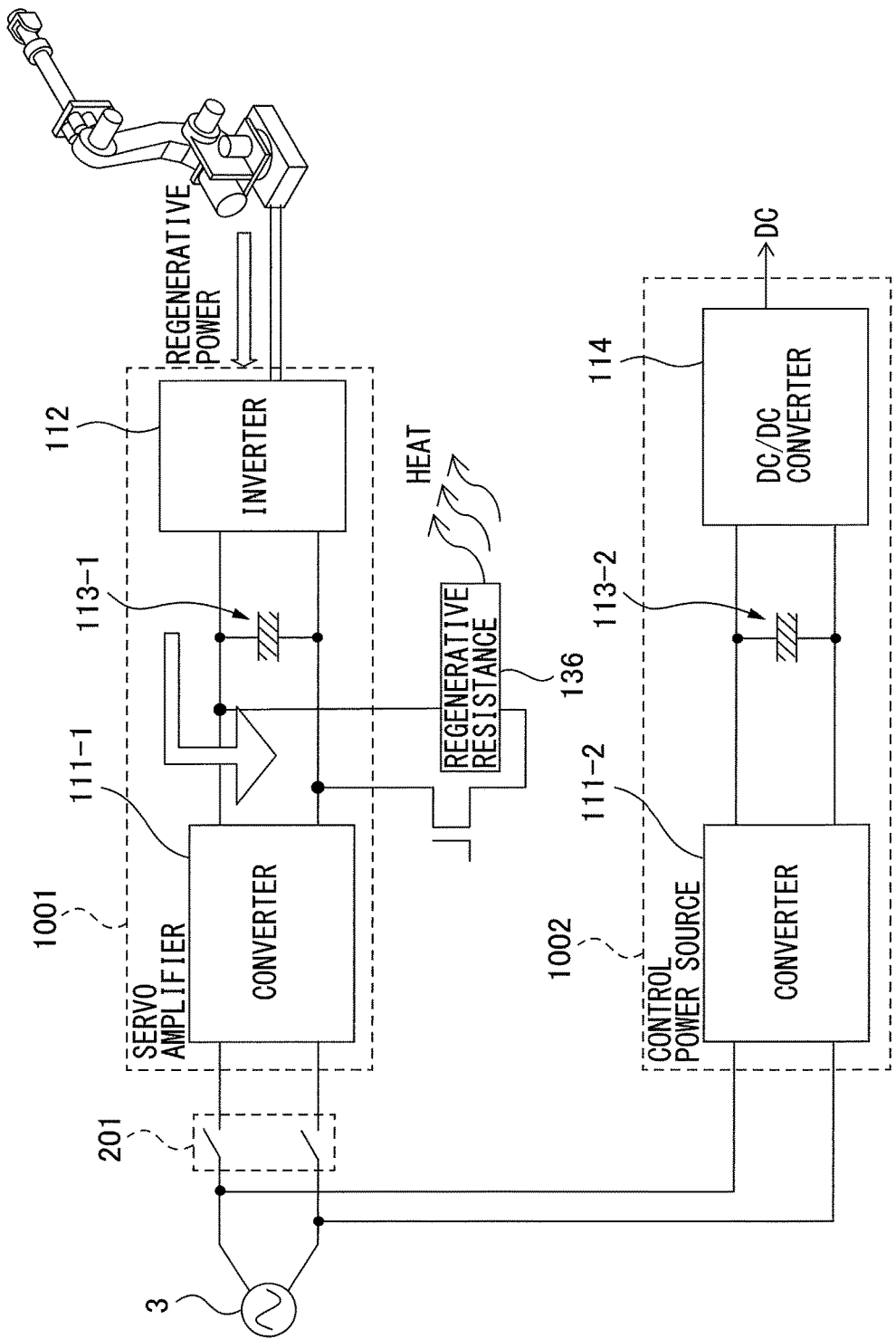
FIG. 15 is a diagram illustrating a configuration in which a regenerative resistance is provided in the conventional motor drive device as illustrated in FIG. 19.
Figure 16A:
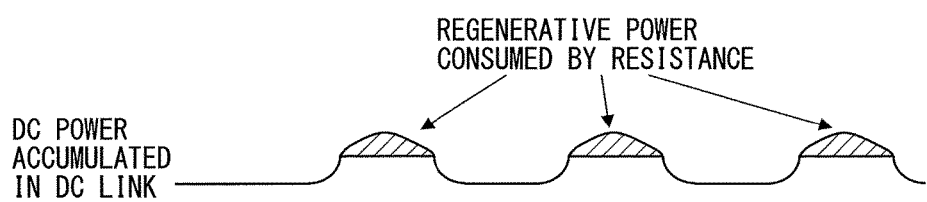
FIG. 16A is a schematic diagram illustrating power consumption of the regenerative resistance in the conventional motor drive device as illustrated in FIG. 15 and schematically illustrates DC power accumulated in a DC link.
Figure 16B:
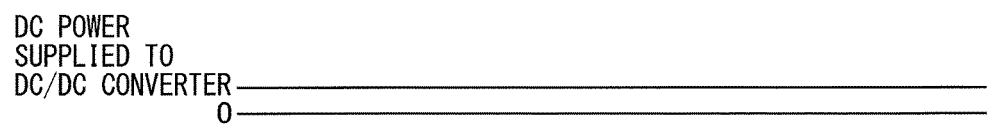
FIG. 16B is a schematic diagram illustrating power consumption of the regenerative resistance in the conventional motor drive device as illustrated in FIG. 15 and schematically illustrates DC power supplied from an AC power source to a DC/DC converter.

FIG. 15 is a diagram illustrating a configuration in which a regenerative resistance is provided in the conventional motor drive device as illustrated in FIG. 19. Further, FIG. 16A is a schematic diagram illustrating power consumption of the regenerative resistance in the conventional motor drive device as illustrated in FIG. 15 and schematically illustrates DC power accumulated in the DC link. In addition, FIG. 16B is a schematic diagram illustrating power consumption of the regenerative resistance in the conventional motor drive device as illustrated in FIG. 15 and schematically illustrates DC power supplied from the AC power source to the DC/DC converter. AC regenerative power generated by deceleration of the servo motor in the robot 4 is converted by the inverter 112 to DC power, which is returned to the DC link and accumulated in the DC link capacitor 113-1. When DC power accumulated in the DC link capacitor 113-1 exceeds a predetermined value (in other words, when a voltage across both ends of the DC link capacitor 113-1 exceeds a predetermined value), such an excessive volume of energy is consumed as heat by a regenerative resistance 136 provided in the servo amplifier 1001. To the DC/DC converter 114 in the control power source 1002, DC power to which AC power supplied from the AC power source 3 is converted by the converter 111-2 is supplied as usual.

Figure 17:
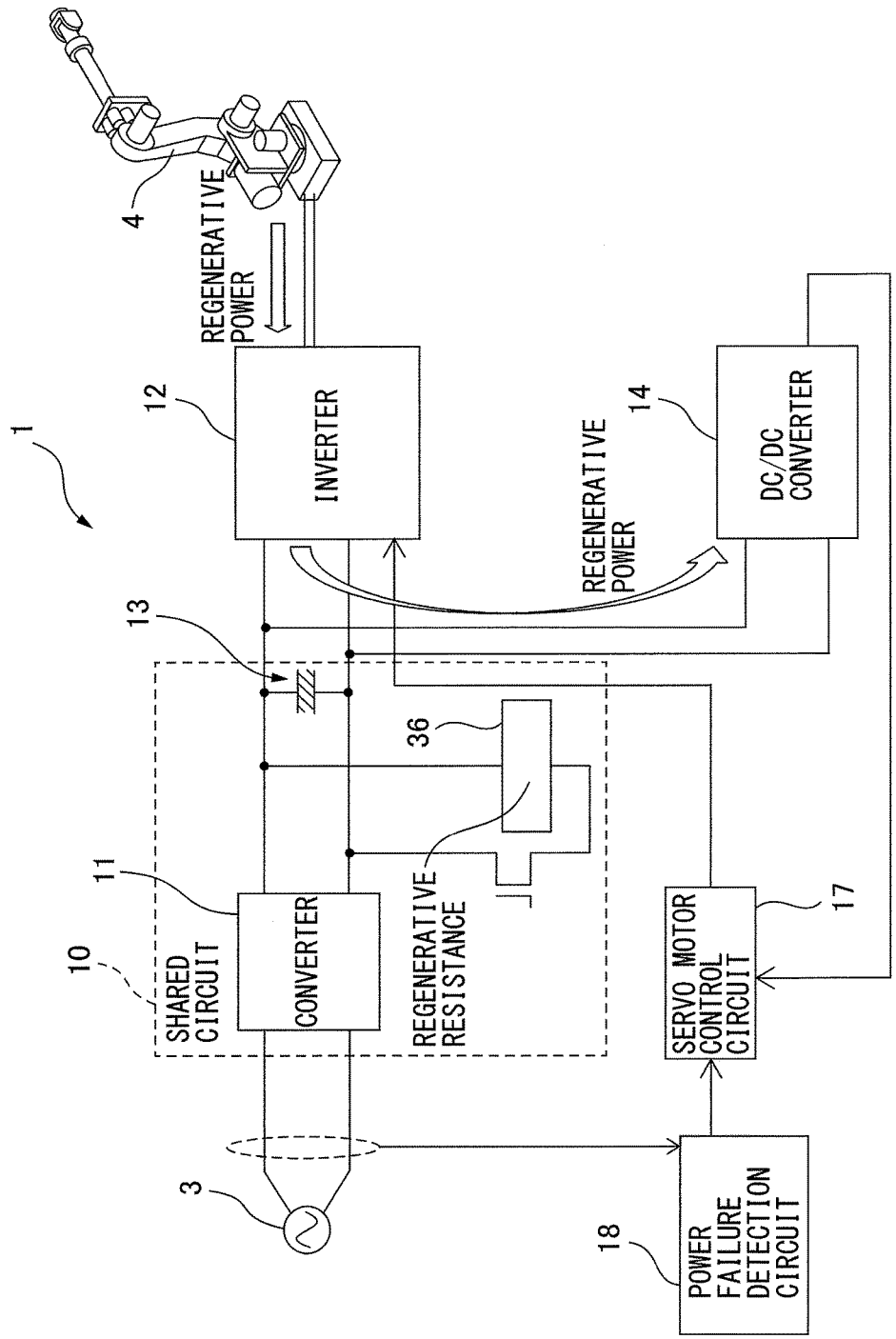
FIG. 17 is a diagram illustrating a configuration in which a regenerative resistance is provided in the motor drive device according to the embodiment of the present disclosure.
Figure 18A:
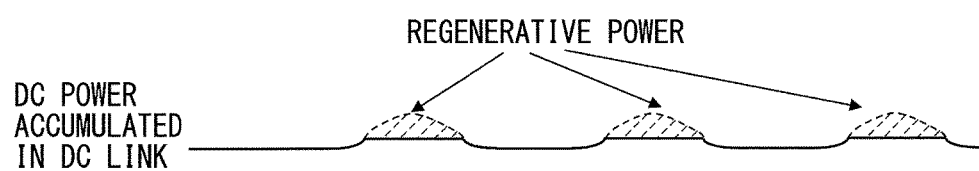
FIG. 18A is a schematic diagram illustrating power consumption of the regenerative resistance in the motor drive device according to the embodiment of the present disclosure as illustrated in FIG. 17 and schematically illustrates DC power accumulated in the DC link.
Figure 18B:
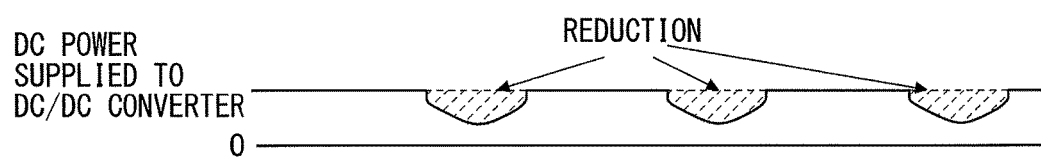
FIG. 18B is a schematic diagram illustrating power consumption of the regenerative resistance in the motor drive device according to the embodiment of the present disclosure as illustrated in FIG. 17 and schematically illustrates DC power supplied from an AC power source to a DC/DC converter.

FIG. 17 is a diagram illustrating a configuration in which a regenerative resistance is provided in the motor drive device according to the embodiment of the present disclosure. Further, FIG. 18A is a schematic diagram illustrating power consumption of the regenerative resistance in the motor drive device according to the embodiment of the present disclosure as illustrated in FIG. 17 and schematically illustrates DC power accumulated in the DC link. In addition, FIG. 18B is a schematic diagram illustrating power consumption of the regenerative resistance in the motor drive device according to the embodiment of the present disclosure as illustrated in FIG. 17 and schematically illustrates DC power supplied from the AC power source to the DC/DC converter. AC regenerative power generated by deceleration of the servo motor in the robot 4 is converted by the inverter 12 to DC power, which is returned to the DC link and accumulated in the DC link capacitor 13. When DC power accumulated in the DC link capacitor 13 exceeds a predetermined value (in other words, when a voltage across the both ends of the DC link capacitor 13 exceeds a predetermined value), such an excessive volume of energy is supplied to the DC/DC converter 14 connected to the same DC link and reused as DC power for the control power source. Consequently, from DC power to which AC power supplied from the AC power source 3 is converted by the converter 11, DC power to be supplied to the DC/DC converter 14 can be reduced by reusing regenerative power generated by deceleration of the servo motor in the robot 4. Thus, according to the motor drive device according to the embodiment of the present disclosure, power consumption can be reduced as compared with conventional ones.

As described above, according to one aspect of the present disclosure, a low-power consuming, small, and low-cost motor drive device which converts AC power supplied from an AC power source side to DC power and outputs the same to a DC link and then further converts the same to AC power for driving a motor and supplies the same to the motor can be realized.

In further detail, according to one aspect of the present disclosure, a converter which converts AC power of an AC power source side to DC power and a DC link capacitor which restrains a ripple component of a DC output of the converter and accumulates DC power are not provided to each of a servo amplifier and a control power source, separately, similarly to conventional examples, but provided as a circuit shared with the servo amplifier and the control power source so that the number of the converter, the DC link capacitor, a DC circuit of any of various types provided to a DC output side of the converter, and an AC circuit of any of various types provided to an AC input side of the converter is reduced, and accordingly, the size of the motor drive device can be reduced and installation cost and operating cost can be reduced.

What is claimed is:

1. A motor drive device comprising:
   one converter which performs power conversion between AC power of an AC power source side and DC power of a DC link which is a DC side;
   a DC link capacitor provided to the DC link;
   at least one inverter connected to a side of the DC link capacitor, opposite to a side where the converter is provided, each switching element being controlled to be turned on/off based on a switching drive signal supplied, to perform power conversion between DC power of the DC link and AC power which is drive power or regenerative power of a motor;
   a DC/DC converter which is connected to the side of the DC link capacitor, opposite to the side where the converter is provided, converts DC power of the DC link to DC power for a control power source, and outputs the same;
   a servo motor control circuit which outputs each switching drive signal for controlling power conversion of the inverter and operates using, as drive power, DC power for the control power source outputted by the DC/DC converter;
   a torque cut-off circuit which allows supply of each switching drive signal to each switching element while receiving a safety signal, and cuts off supply of each switching drive signal to each switching element, to stop power conversion of the inverter when not receiving a safety signal; and
   a safety monitor circuit which stops transmission of the safety signal to the torque cut-off circuit when an abnormality of the torque cut-off circuit occurs,
   wherein the converter and the DC link capacitor are provided as a shared circuit for the inverter and the DC/DC converter, and
   when an abnormality of the torque cut-off circuit occurs, the converter continues power conversion to provide power to the DC/DC converter.

2. The motor drive device according to claim 1, wherein the safety monitor circuit stops transmission of the safety signal to the torque cut-off circuit when receiving an emergency stop signal from an upper-level controller.

3. The motor drive device according to claim 1, wherein the safety monitor circuit determines whether or not an abnormality of the torque cut-off circuit occurs based on the safety signal transmitted to the torque cut-off circuit and a state signal indicating a state of the torque cut-off circuit, the state signal being received from the torque cut-off circuit.

4. The motor drive device according to claim 1, wherein when an occurrence of an abnormality of the AC power source is detected, the servo motor control circuit controls power conversion of the inverter in such a manner as to gradually decelerate the motor connected to the inverter.

5. The motor drive device according to claim 1, further comprising a DC circuit constituted by at least one of a power factor improvement circuit, a voltage boost circuit, a voltage step-down circuit, a regenerative resistance, and an initial charge unit for initially charging the DC link capacitor.

6. The motor drive device according to claim 1, further comprising:
   a DC circuit breaker connected to the DC link; and
   a control circuit for such a control as to cut off a current path of the DC circuit breaker after power conversion of the inverter is stopped by the torque cut-off circuit.

7. The motor drive device according to claim 1, further comprising an AC circuit connected to the AC power source side of the converter and constituted by at least one of an EMC filter, a breaker, a transformer, and an AC circuit breaker.

* * * * *